June 3, 1941.   C. H. STRIDH   2,244,179
MACHINE FOR CLEANING ANIMAL INTESTINES
Filed June 9, 1939   3 Sheets-Sheet 1
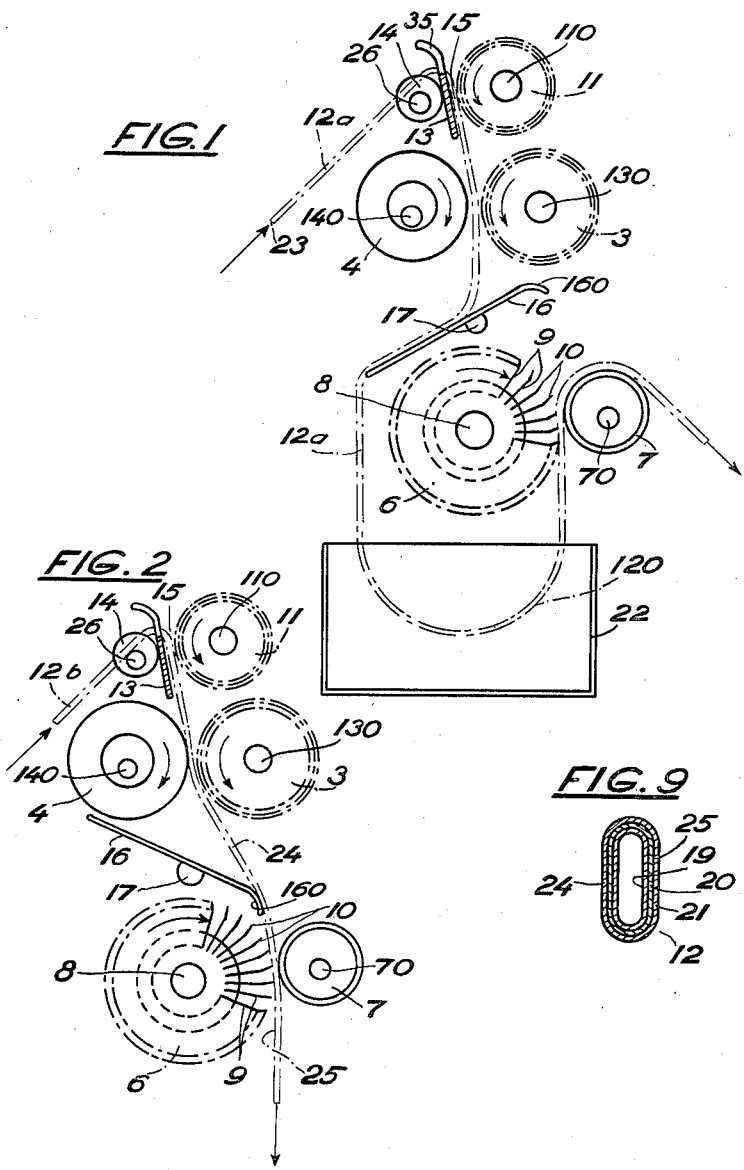

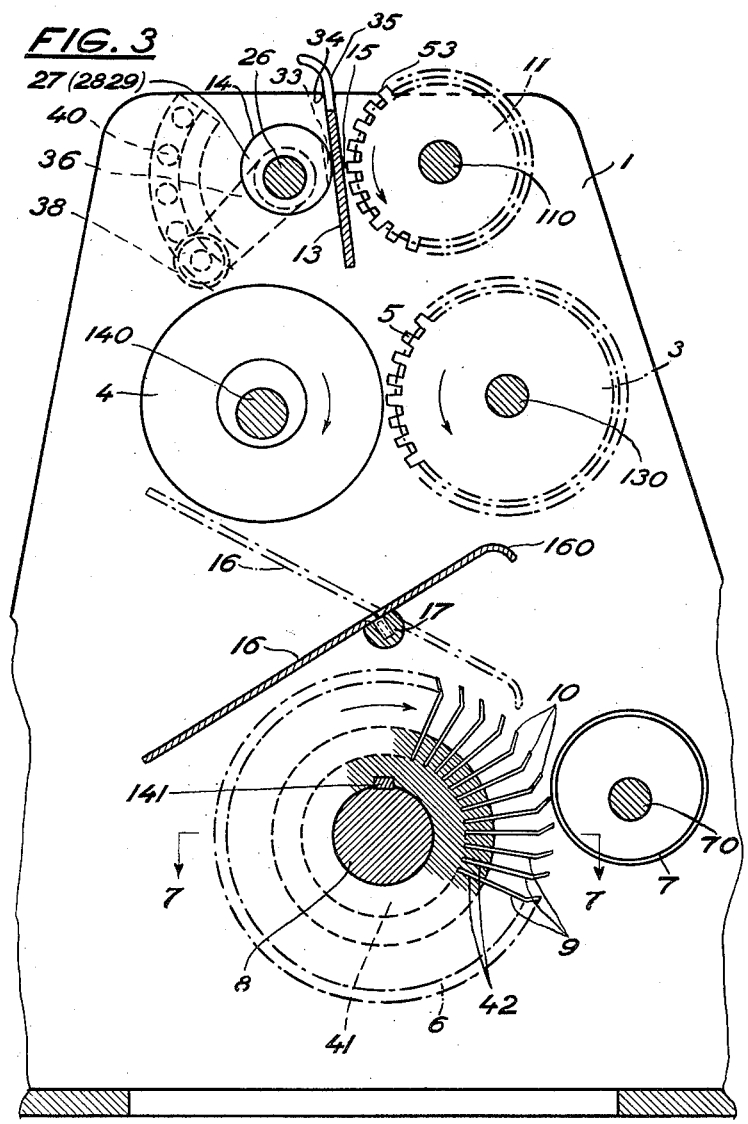

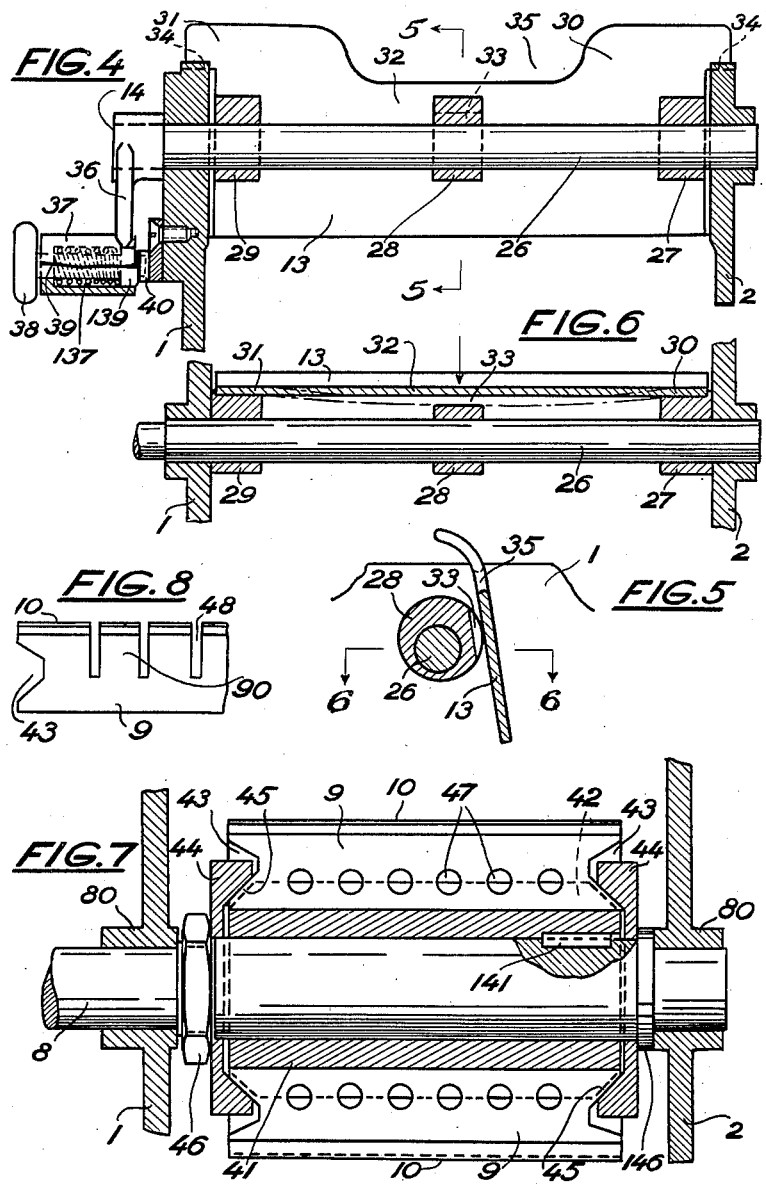

Patented June 3, 1941

2,244,179

UNITED STATES PATENT OFFICE 2,244,179

MACHINE FOR CLEANING ANIMAL INTESTINES

Carl H. Stridh, Goteborg, Sweden, assignor of one-half to Carl Jonsson, Goteborg, Sweden Application June 9, 1939, Serial No. 278,359
In Sweden December 3, 1937

7 Claims. (Cl. 17—43)

This invention refers to a machine for cleaning animal intestines so as to make them fit for use as sausage casings. The principal object of this invention is to provide an improved method to clean intestines of neat cattle. A further object of this invention is to provide a machine by which intestines of different kinds of animals can be cleaned mechanically.

When cleaning the intestines of sheep and swine the interior tissue as well as the outer cuticle must be removed which is performed by passing the intestine between two successive pairs of revolving rollers or similar actuating members, the first of these pairs revolving in the same direction as the feed of the intestine, and the second pair revolving opposite to said feeding direction. As for intestines of neat cattle, however, only the interior tissue is to be removed, for which purpose the intestine is turned inside out. Such cleaning cannot be satisfactorily done in the same way as just mentioned, because then always the same side of the intestine which has been turned inside out will be treated, and the opposite side thereof will be left untreated.

By means of this invention, the both sides of the intestine turned inside out can be readily cleaned. In accordance with this invention the intestines thus turned are passed between two successive pairs of rollers or similar members of which the antecedent pair will loosen the interior tissue of the intestine on the one side, and the second pair will loosen the tissue on the opposite side of the same intestine but simultaneously expose said intestine for rapidly repeated blows which prevent the loosened tissue from following the intestine into between the second pair of rollers or actuating members and constrain the tissue to move rearwards relatively to the feed of the intestine so as to be expelled through the rear end of intestine when this end reaches the introduction side of said second pair of members.

When treating neat cattle intestines both pairs of actuating members revolve in the feed direction of the intestine, but when treating sheep or swine intestine only the preceding pair of actuating members must be revolved in this direction, while the second pair is revolved opposite to the feed direction. For rendering the same machine suitable for treating both kinds of intestines without changing the movements of the actuating members, and thus to simplify the machine and its operation, means are provided to reverse the direction of feed of the intestines, before they reach the second pair of actuating members. By this invention such a reversing of the feeding direction of the intestine is accomplished by means of an adjustable baffle disposed between the two pairs of actuating members which are positioned the one substantially straight below the other, so that the intestine when leaving the uppermost or first pair of actuating members will be prevented by the baffle from entering directly between the lowermost or second pair of actuating members but is guided laterally of the last mentioned pair of members and thereupon carried upwards into the space between the second pair of actuating members which now move contrary to the motion of the intestine so that the direction of rotation of said members nevertheless will be contrary to the feeding direction of the intestine.

If the same machine is to be used for cleaning intestine of neat cattle also, nothing else is to be done than to adjust the baffle so as to incline in the opposite direction by which means the intestine when leaving the uppermost pair of actuating members is free to enter directly into the space between the undermost pair of actuating members and thus to pass therebetween in the initial direction, that is to say, the same as that one in which the second pair of actuating members are revolving.

The accompanying drawings illustrate the improved machine by which cleaning is carried out for intestines of neat cattle and those of sheet or swine.

Figure 1 shows diagrammatically the machine adjusted for treating intestines of sheep or swine.

Figure 2 is a similar view of the machine adjusted for treating of neat cattle intestines.

Figure 3 shows in more detail a vertical section of the machine adjusted for the treating of sheep or swine intestines, but showing also by dot-and-dash lines how the baffle can be tilted to make the same machine ready for treating neat cattle intestines.

Figure 4 is a section of the uppermost portion of the same machine taken on a plane perpendicular to that of Figure 3.

Figure 5 is a cross section on line 5—5 of Figure 4.

Figure 6 is a section on line 6—6 of Figure 5.

Figure 7 is a section on line 7—7 of Figure 3.

Figure 8 is a broken view of a modification of the arrangement shown in Figure 7, and Figure 9 is a diagrammatical cross section of an intestine.

In the drawings, the same reference numerals are used for similar parts throughout all figures.

Referring principally to Figures 1 and 2, the supporting plates of the machine frame are indicated at 1 and 2 and the first or uppermost pair of actuating members is designated with 3 and 4, of which 3 is a roller adapted to be positively revolved at a comparably high speed on its shaft 130 by some suitable gears (not shown) from some prime motor. The surface of roller 3 which is made of steel or cast-iron is provided with teeth-like ridges 5 (Fig. 3) extending axially along the length of the roller. In Figs. 1 and 2 these ridges are only indicated by dot-and-dash circular lines. The other roller 4 of said pair has a smooth surface and is made of rubber or any similar comparably resilient material or is provided with a cover of such material around a body of steel or cast-iron. This roller is mounted for adjustment towards the positively revolved roller 3 so as to be made to revolve with the same peripheral speed by the frictional pressure between the two rollers.

Below the first pair of rollers 3 and 4 there is a second pair of rollers or similar members 6 and 7, the axis of which are parallel to the axis of the first-mentioned pair of rollers 3, 4. The roller 6 is positively revolved with substantially the same peripheral speed as is roller 3 but in opposite direction thereto. The roller 6 is composed by a plurality of yielding plates 9 projecting radially from a body shaft 8 (see Figure 3), the outer ends 10 of said plates being bent in a direction opposite to the direction of the revolving of the roller 6. The other roller 7 of the same pair is stationary and preferably provided with means whereby it may be adjusted to or from the roller 6. This adjustment can be effected by an eccentrically mounted shaft 70 of roller 7 as is also the case with roller 4 in the first mentioned pair by means of its shaft 140, but adequate means of any other kind also can be utilized for the same purpose.

Above the first pair of actuating members 3 and 4 there is a feed roller 11 rotatable on a shaft 110 positioned parallel to the shafts 130 and 140. Feed roller 11 is provided with ridges 53 similar to those on roller 3 and indicated by dot-and-dash circular lines in Figure 1 but more clearly shown in Figure 3. Feed roller 11 revolves at a considerably lower speed than does roller 3, and it cooperates with a screen 13 which is substantially tangential to roller 11 and adjustable to and from said roller by an eccentric means 14 comprising a shaft 26, a crank 36 and eccentrics 27, 28, 29 the details of which will be further described hereinafter. By this adjusting means only a slight interspace 15 is left for the intestines when entering into the machine.

Between the two pairs of actuating members 3—4 and 6—7 there is a baffle 16 hinged upon a turnable axis 17 by means of which the baffle 16 can be tilted to the left or to the right as shown in Figures 1 and 2 respectively, depending upon the use of the machine for sheep or swine intestines or for neat cattle intestines.

Below the undermost pair of actuating members 6—7 there is a tank 22 resting for instance on the floor and containing a wetting liquid. This tank 22 is shown only diagrammatically in Figure 1 and has been omitted in Figures 2 and 3.

In Figure 1, the machine is shown adjusted for the treating of sheep or swine intestines. In this case, baffle 16 is tilted to the left. The intestine in this figure is designated with 12a, and is introduced between screen 13 and feed roller 11 in the interspace 15, and by the friction between them the intestine is fed to the first pair of actuating members 3, 4 which squeeze the intestine sufficiently to loosen the interior tissue 19 from the wall 20 of the intestine (see Figure 9 in which the intestine is designated by 12). Simultaneously the outer cuticle 20 (Figure 9) is removed principally by the action of the ridges 5 of roller 3 and the higher speed of rollers 3 and 4 than that of feed roller 11. Now, the intestine falls down upon the baffle 16, the left hand inclination of which causes the intestine to slide laterally (as visible in Figure 1) of the second pair of actuating members 6, 7. The advance end of the intestine thereupon is inserted between the lastmentioned pair 6, 7 from below, since a sufficiently long portion of the intestine 12a has passed from the first pair of actuating members 3, 4 to form a loop 120 which passes through the bath in tank 22. Preferably said bath comprises hot water for the purpose of washing and heating the intestine so as to assist in the removing of the loosened substances. When travelling between the lower pair of rollers 6, 7 from below the intestine is actuated upon in a direction opposite to that of its travel, and it departs from said rollers as illustrated in Figure 1 by the arrow at the right hand side of roller 7 under the action of some feeding device not shown in any of the figures, but easily understood by anybody skilled in the art. The striking action of the ends 10 of the yielding plates 9, which move with a considerable speed, upon the intestine, as this is pressed against the adjustable roller 7, prevents the loosened interior tissue from following the intestine over the roller 7, and holds it back as the intestine advances, resulting therein that the tissue is expelled through the rear end 23 of the intestine when this end reaches the pair of rollers 6, 7.

When cleaning intestines of neat cattle, the baffle 16 is moved into the position shown in Figure 2, in which position the bent right hand end 160 of the baffle is situated such, that the intestine when departing from the upper pair of actuating members 3, 4 is guided between the two rollers 6, 7 of the undermost pair. In Figure 2 the same designations are used for similar parts as in Figure 1, except that the intestine is designated with 12b on the upper left hand side where it enters the machine between feed roller 11 and counter screen 13. From the entering of the intestine into the machine until it arrives upon the baffle 16 the treatment is the same as that above described for sheep intestines except that the treatment by the members 3, 4 is performed upon the inside of the intestine instead of upon its outside as was the case when treating sheep or swine intestines. On account of the position of baffle 16, the intestine is guided directly to the second pair of actuating members 6, 7 and travels between them in the same direction as the rotation of members 6, 7, but the action of said members upon the intestine is entirely the same as that explained before.

Because of the relative arrangement of the rollers 3 and 6 and the direct passage of the intestine therebetween, the roller 3 of the first pair and roller 6 of the second pair are disposed on opposite sides of the intestine. Hence the intestine is treated on its right hand side in the uppermost pair of actuating members and on its left hand side in the lowermost pair of said members. This is illustrated in Figure 2 by the designation 24 for the part of intestine above the baffle 16, and the designation 25 for the part below said baffle, whereby the numerals 24 and 25 refer to the respective sides of the cross-section shown in Figure 9, bearing in mind that when travelling through the machine, the intestine is turned inside out so that the innerside of the walls 24, 25 are treated.

The structural features of the machine by which the above mode of operation is carried out are as follows:

The roller 6 is composed of a sleeve 41 secured to shaft 8 by a key 141 and provided, around its cylindrical surface, with a plurality of radial slits 42 extending along the whole length of the sleeve into each of which slits one of the yielding plates 9 is inserted and fastened as described below. Figure 7 shows how the plates 9 are kept in their proper position longitudinally by means of washers 44 which are pressed against the ends of sleeve 41 by a nut 46 on the screw threaded shaft 8 on the left hand side and by a collar 146 on the right hand side, while shaft 8 is journalled in bearings 80 in the two frame plates 1 and 2 which are parts of the frame of the machine. Each washer 44 is provided with a cavity on the surface facing the sleeve 41, and the outer wall of the cavity has a conical surface 45 which acts upon similar sloping edges formed by recesses 43 provided in the plates 9. When tightening the nut 46, the conical surface 45 of washers 44 force the plates 9 rigidly on to the sleeve 41.

Perforations 47 serve to increase the elasticity of the plates 9. For the same purpose the plates may be provided with radial slits 48 which divide the free edge of plates 9 into a plurality of tongues 90.

The crank 36 carries at its free end a knob 38 acting upon a stud 39 within a bushing 37 and at its opposite end provided with a head 139 coacting with the notches 40 in frame plate 1 by aid of a spiral spring 137 surrounding the stud 39 within the bushing 37. By this means, the shaft 26 can be secured in any desired angular position so that the eccentrics 27, 28, 29 force the screen 13 more or less against the feed roller 11. The two extreme eccentrics 27, 29 actuate each the respective end portion 30, 31 of the screen 13, while the centre eccentric 28 acts upon the middle portion 32 of the same screen as visible in Figures 4 and 6. The eccentric 28, however, does not contact the screen around its whole circumference, but there is a cut away portion 33 in the eccentric (most clearly visible in Figures 5 and 6) so that in a certain angular position of the shaft 26 a space is left between eccentric 28 and the middle portion 32 of screen 13, while the two extreme eccentrics 27, 29 contact at their peripheries 30, 31 in all angular positions. Thus, the screen will yield in its centre portion when subjected to the pressure from the intestine between feed roller 11 and screen 13 which will prevent damage of intestine and screen (see Figure 6 where the dot-and-dash line indicates the yielding of screen 13). The screen 13 is held in position in the frame plates 1 and 2 in notches 34, and a recess 35 (Figures 3, 4 and 5) guides the entering of the intenstine into the machine.

The machine is not necessarily constricted to the constructive embodiments illustrated in the drawings but several of the various details can be substituted by adequate means adapted to perform the same results. For instance, the yielding plates 9 can be substituted by a plurality of wires or narrow strips of some elastic metal as steel, and the embodiment illustrated has principally for its object only to show useful means for accomplishing the method.

What I claim is:

1. In a machine for cleaning the intestines of different animals, a device for feeding intestines, first and second units for successively exerting a cleaning action upon intestines passing therethrough, and a baffle plate adjustably mounted between the two units and operable in one position thereof to guide intestines in a direct path from the first unit for passage through the second unit in one direction and, in a second position to deflect intestines laterally of the second unit for passage therethrough in the opposite direction.

2. In a machine for cleaning the intestines of different animals, a device for feeding intestines, first and second units for successively exerting a cleaning action upon intestines passing therethrough, said units including rotatable cleaning members, and a baffle plate adjustably mounted between the two units and operable in one position thereof to guide intestines in a direct path from the first unit for passage through the second unit in one direction and, in a second position, to deflect intestines laterally of the second unit for passage therethrough in the opposite direction, the rotatable member for the second unit moving in the same direction with the intestines, during direct passage of the latter through the second unit, and in opposition to the intestines during movement of the latter in said opposite direction.

3. In a machine for cleaning the intestines of different animals, a device for feeding intestines, first and second units for successively exerting a cleaning action upon intestines passing therethrough, said units including rotatable cleaning members, and a baffle plate adjustably mounted between the two units and operable in one position thereof to guide intestines in a direct path from the first unit for passage through the second unit in one direction and, in a second position, to deflect intestines laterally of the second unit for passage therethrough in the opposite direction, the rotatable member for the second unit moving in the same direction with the intestines, during direct passage of the latter through the second unit, and in opposition to the intestines during movement of the latter in said opposite direction, the rotatable members of both units rotating in the same direction.

4. In a machine for cleaning the intestines of different animals, a device for feeding intestines, first and second units for successively exerting a cleaning action upon intestines passing therethrough, a baffle plate adjustably mounted between the two units and operable in one position thereof to guide intestines in a direct path from the first unit for passage through the second unit in one direction and, in a second position to deflect intestines laterally of the second unit for passage therethrough in the opposite direction, the portions of the intestines deflected by said baffle plate depending therefrom in the form of a loop, and means for subjecting the loop portion to further cleaning treatment.

5. In a machine for cleaning the intestines of different animals, a device for feeding intestines, first and second units for successively exerting a cleaning action upon intestines passing therethrough, and a baffle plate adjustably mounted between the two units and operable in one position thereof to guide intestines in a direct path from the first unit for passage through the second unit in one direction and, in a second position to deflect intestines laterally of the second unit for passage therethrough in the opposite direction, said units including rotatable members provided, respectively, with rigid and resilient tooth-like parts.

6. In a machine for cleaning intestines of animals, cleaning units for exerting a cleaning action upon the intestines, and a device for feeding intestines to said cleaning units, said feeding device including a rotatable member, a plate-like member facing said rotatable member, a shaft positioned behind said plate-like member, and eccentrics on said shaft cooperating with said plate-like member for adjusting the latter with respect to said rotatable member, the eccentric coacting with the medial portion of said plate-like member having a portion thereof cut away to accommodate limited yielding movement of the medial portion of the plate-like member in one angular position of the shaft and the eccentrics carried thereby.

7. In a machine for cleaning intestines of animals, cleaning units for exerting a cleaning action upon intestines, a device for feeding intestines to said cleaning units, said feeding device including a rotatable member, a plate-like member facing said rotatable member, a shaft positioned behind said plate-like member, and eccentrics on said shaft cooperating with said plate-like member for adjusting the latter with respect to said rotatable member, the eccentric coacting with the medial portion of said plate-like member having a portion thereof cut away to accommodate limited yielding movement of the medial portion of the plate-like member in one angular position of the shaft and the eccentrics carried thereby, said plate-like member having a recess therein for guiding intestines along the medial portion thereof.

CARL H. STRIDH.